United States Patent
Si et al.

(10) Patent No.: US 12,082,000 B2
(45) Date of Patent: Sep. 3, 2024

(54) METHOD FOR DETERMINING QUASI CO-LOCATED (QCL) INFORMATION, METHOD FOR CONFIGURING QCL INFORMATION, AND RELATED DEVICES

(71) Applicant: VIVO MOBILE COMMUNICATION CO.,LTD., Guangdong (CN)

(72) Inventors: Ye Si, Chang'an Dongguan (CN); Peng Sun, Chang'an Dongguan (CN); Huaming Wu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 399 days.

(21) Appl. No.: 17/587,276

(22) Filed: Jan. 28, 2022

(65) Prior Publication Data
US 2022/0159479 A1    May 19, 2022

Related U.S. Application Data

(63) Continuation of application No. PCT/CN2020/105189, filed on Jul. 28, 2020.

(30) Foreign Application Priority Data

Aug. 2, 2019  (CN) .......................... 201910713450.8

(51) Int. Cl.
H04W 16/28  (2009.01)
H04L 5/00   (2006.01)
H04W 56/00  (2009.01)

(52) U.S. Cl.
CPC .......... *H04W 16/28* (2013.01); *H04L 5/0051* (2013.01); *H04W 56/001* (2013.01)

(58) Field of Classification Search
None
See application file for complete search history.

(56) References Cited

U.S. PATENT DOCUMENTS

2016/0223639 A1   8/2016   Davydov et al.
2018/0270784 A1   9/2018   Lee et al.
2019/0007933 A1   1/2019   Yi et al.
(Continued)

FOREIGN PATENT DOCUMENTS

CN   107409286 A   11/2017
CN   107925496 A   4/2018

OTHER PUBLICATIONS

European Search Report in Application No. 20849070.6 Dated Aug. 5, 2022.
(Continued)

*Primary Examiner* — Angela Nguyen
(74) *Attorney, Agent, or Firm* — Brooks Kushman P.C.

(57) ABSTRACT

A method for determining quasi co-located (QCL) information, a method for configuring the QCL information, and related devices are provided. The method for determining the QCL information includes: receiving first indication information transmitted by a network device, wherein the first indication information is used to indicate a first QCL relationship between a first positioning reference signal and a target object; and according to the first QCL relationship, determining a QCL reference signal of the first positioning reference signal, or determining a QCL reference signal of the target object.

20 Claims, 3 Drawing Sheets

(56) References Cited

U.S. PATENT DOCUMENTS

| | | | |
|---|---|---|---|
| 2019/0044677 A1 | 2/2019 | Ly | |
| 2019/0260532 A1* | 8/2019 | Manolakos | H04L 5/0051 |
| 2020/0045709 A1* | 2/2020 | Seo | H04W 72/53 |
| 2021/0306985 A1* | 9/2021 | Eriksson | H04B 7/022 |

OTHER PUBLICATIONS

"On Radio-Layer Procedures for NR Positioning" 3GPP TSG RAN WG1 Meeting #96bis, Intel Corporation, R1-1904322, Apr. 8, 2019.
CN Office Action in Application No. 201910713450.8 Dated Apr. 6, 2021.
"DL Reference Signals for NR Positioning" 3GPP TSG RAN WG1 #97, CATT, R1-1906305, May 13, 2019.
"Physical-layer procedures in NR positioning" 3GPP TSG RAN WG1 #97, Ericsson, R1-1907511, May 13, 2019.
"Summary #2 of 7.2.10.4: PHY procedures for positioning measurements" 3GPP TSG-RAN WG1 Meeting #97, Qualcomm Incorporated, R1-1907841, May 13, 2019.
Written Opinion and International Search Report in Application No. PCT/CN2020/105189 Dated Oct. 20, 2020.
First Office Action for Korean Application No. 10-2022-7006903, dated Jan. 22, 2024, 5 Pages.
Intel Corporation "Offline Discussion Outcome on DL Reference Signals for NR Positioning" 3GPP TSG RAN WG1 Meeting #96bis, Xi'an, China, Apr. 2019, R1-1905847, 12 Pages.
Qualcomm Incorporated "Summary of 7.2.10.4: PHY procedures for positioning measurements" 3GPP TSG-RAN WG1 Meeting #97, Reno, Nevada, USA, May 2019, R1-1907675, 17 Pages.

* cited by examiner

METHOD FOR DETERMINING QUASI CO-LOCATED (QCL) INFORMATION, METHOD FOR CONFIGURING QCL INFORMATION, AND RELATED DEVICES

CROSS-REFERENCE TO RELATED APPLICATIONS

This application is continuation application of PCT International Application No. PCT/CN2020/105189 filed on Jul. 28, 2020, which claims priority to Chinese Patent Application No. 201910713450.8, filed on Aug. 2, 2019 in China, the disclosures of which are incorporated herein by reference in their entireties.

TECHNICAL FIELD

The present disclosure relates to the technical field of communication, and in particular, to a method for determining quasi co-located (QCL) information, a method for configuring the QCL information, and related devices.

BACKGROUND

In a 5G new radio (NR) system, a network device may configure a QCL relationship among reference signals through a radio resource control (RRC) signaling. In a 5G NR positioning system, positioning reference signals (PRS) are introduced. PRS serves as a newly introduced reference signal, and how to configure the QCL information of the PRS is still under discussion.

SUMMARY

Embodiments of the present disclosure provide a method for determining quasi co-located (QCL) information, a method for configuring the QCL information, and related devices.

According to a first aspect, embodiments of the present disclosure provide a method for determining quasi co-located (QCL) information, applied to a terminal. The method for determining the QCL information includes:

receiving first indication information transmitted by the network device, wherein the first indication information is used to indicate a first QCL relationship between a first positioning reference signal and a target object; and according to the first QCL relationship, determining a QCL reference signal of the first positioning reference signal, or determining a QCL reference signal of the target object, wherein the target object at least includes one of a first channel state information-reference signal (CSI-RS), a synchronization signal and PBCH block (SSB), a second positioning reference signal, a first tracking reference signal (TRS), a first sounding reference signal (SRS), a first demodulation reference signal (DMRS), a first physical downlink shared channel (PDSCH) and a first physical downlink control channel (PDCCH).

According to a second aspect, embodiments of the present disclosure provide a method for configuring QCL information, applied to a network device. The method for configuring the QCL information includes;

transmitting first indication information to a terminal, wherein the first indication information is used to indicate a first QCL relationship between a first positioning reference signal and a target object; and wherein the target object at least includes one of a first channel state information-reference signal (CSI-RS), a synchronization signal and PBCH block (SSB), a second positioning reference signal, a first tracking reference signal (TRS), a first sounding reference signal (SRS), a first demodulation reference signal (DMRS), a first physical downlink shared channel (PDSCH) and a first physical downlink control channel (PDCCH).

According to a third aspect, embodiments of the present disclosure further provide a terminal, including:

a receiving module, configured to receive first indication information transmitted by the network device, wherein the first indication information is used to indicate a first QCL relationship between a first positioning reference signal and a target object; and a determination module, configured to, according to the first QCL relationship, determine a QCL reference signal of the first positioning reference signal, or determine a QCL reference signal of the target object, wherein the target object at least includes one of a first channel state information-reference signal (CSI-RS), a synchronization signal and PBCH block (SSB), a second positioning reference signal, a first tracking reference signal (TRS), a first sounding reference signal (SRS), a first demodulation reference signal (DMRS), a first physical downlink shared channel (PDSCH) and a first physical downlink control channel (PDCCH).

According to a fourth aspect, the embodiments of the present disclosure further provide a network device, including:

a transmitting module, configured to transmit first indication information to a terminal, wherein the first indication information is used to indicate a first QCL relationship between a first positioning reference signal and a target object; and wherein the target object at least includes one of a first channel state information-reference signal (CSI-RS), a synchronization signal and PBCH block (SSB), a second positioning reference signal, a first tracking reference signal (TRS), a first sounding reference signal (SRS), a first demodulation reference signal (DMRS), a first physical downlink shared channel (PDSCH) and a first physical downlink control channel (PDCCH).

According to a fifth aspect, embodiments of the present disclosure further provide a terminal, including: a memory, a processor, and a program stored in the memory and capable of running on the processor. When the program is executed by the processor, steps of the method for determining the QCL information are implemented.

According to a sixth aspect, embodiments of the present disclosure further provide a terminal, including: a memory, a processor, and a program stored in the memory and capable of running on the processor. When the program is executed by the processor, steps of the method for configuring the QCL information are implemented.

According to a seventh aspect, embodiments of the present disclosure further provide a computer readable storage medium. The computer readable storage medium stores a computer program; and when the program is executed by the processor, steps of the method for determining the QCL information are implemented, or when the program is executed by the processor, steps of the method for configuring the QCL information are implemented.

DETAILED DESCRIPTION OF EMBODIMENTS

The technical solutions in the embodiments of the present disclosure are described below clearly with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

The term "include" and any other variants in this specification and claims of this application are intended to cover a non-exclusive inclusion, for example, a process, method, system, product, or device that includes a list of steps or units is not necessarily limited to those expressly listed steps or units, but may include other steps or units not expressly listed or inherent to such a process, method, product, or device. In addition, "and/or" used in this specification and claims means at least one of the connected objects. For example, A and/or B represents the following three cases: Only A exists, only B exists, and both A and B exist.

In the embodiments of the present disclosure, the word such as "exemplary" or "example" is used to represent giving an example, an illustration, or a description. Any embodiment or design scheme described as "exemplary" or "for example" in the embodiments of this disclosure should not be construed as being more preferred or advantageous than other embodiments or design schemes. To be precise, the use of the term such as "exemplary" or "for example" is intended to present a related concept in a specific manner.

The embodiments of the present disclosure are described below with reference to the accompanying drawings. A method for determining QCL information, A method for configuring the QCL information, a terminal and a network device provided in the embodiments of the present disclosure can be applied to a wireless communication system. The wireless communication system may be a 5G system, an evolved long term evolution (eLTE) system, or a subsequent evolved communication system.

Figure 1:
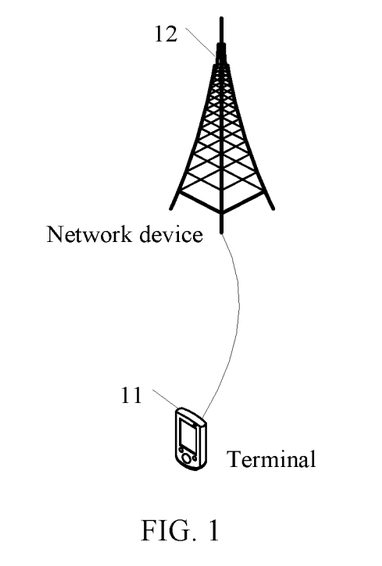
FIG. 1 is a structural diagram of a network system to which an embodiment of the present disclosure can be applied.

Referring to FIG. 1, FIG. 1 is a structural diagram of a network system that can be applied to an embodiment of the present disclosure. As shown in FIG. 1, the network system includes: a terminal 11 and a network device 12. The terminal 11 may be a user terminal or other terminal side devices, for example, a mobile phone, a tablet personal computer, a laptop computer, a personal digital assistant (PDA), a mobile Internet device (MID), or a wearable device. It should be noted that a specific type of the terminal 11 is not limited in the embodiments of the present disclosure. The network device 12 may be a 5G base station, or a base station of a later version, or a base station in other communication systems, or a location server (Evolved Serving Mobile Location Center, E-SMLC), or a location server (Location Management Function, LMF) of 5G and a network side device in the later version, or be called as a node B and an evolved node B, or a transmission reception point (TRP), or an access point (AP), or other words in the field. As long as the same technical effect is achieved, the network device is not limited to a technical specific vocabulary. In addition, the network device 12 may be a master node (MN), or a secondary node (SN). It should be noted that in the embodiments of the present disclosure, only the 5G base station is used as an example, but a specific type of the network device is not limited.

Figure 2:
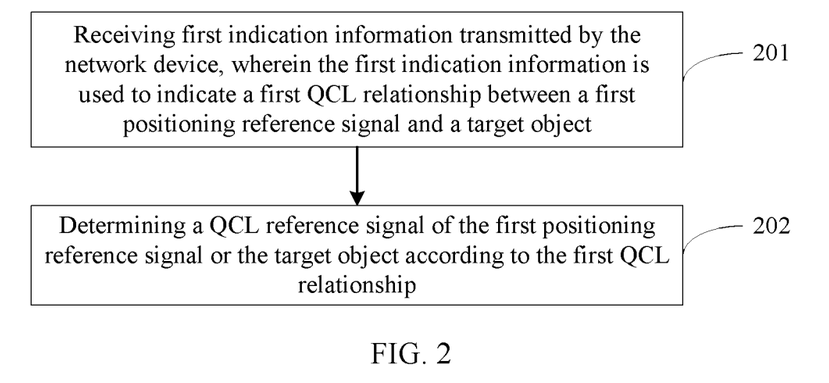
FIG. 2 is a flowchart of a method for determining QCL information according to an embodiment of the present disclosure.

Referring to FIG. 2, FIG. 2 is a flowchart of a method for determining QCL information according to an embodiment of the present disclosure. The method is applied to a terminal. As shown in FIG. 2, the method includes the following steps:

step 201: receiving first indication information transmitted by the network device, wherein the first indication information is used to indicate a first QCL relationship between a first positioning reference signal and a target object; and step 202: according to the first QCL relationship, determining a QCL reference signal of the first positioning reference signal, or determining a QCL reference signal of the target object, wherein the target object at least includes one of a first channel state information-reference signal (CSI-RS), a synchronization signal and PBCH block (SSB), a second positioning reference signal, a first tracking reference signal (TRS), a first sounding reference signal (SRS), a first demodulation reference signal (DMRS), a first physical downlink shared channel (PDSCH) and a first physical downlink control channel (PDCCH).

The first indication information may be configured or indicated by at least one of the following:

a direct signaling between a location server and a terminal, such as an LTE positioning protocol (LPP);

an RRC signaling;

a medium access control control element (MAC CE); and a downlink control information (DCI) signaling.

In the embodiments of the present disclosure, after the terminal receives the first indication information, the QCL reference signal of the first positioning reference signal may be determined according to the content of the first indication information, for example, the QCL reference signal of the first positioning reference signal may be determined according to the target object; or the QCL reference signal of the target object may be determined according to the content of the first indication information, for example, the first positioning reference signal may serve as the QCL reference signal of the target object. It should be noted that the positioning reference signal described above may also be described as a downlink positioning reference signal (DL-PRS) or a downlink positioning reference signal resource (DLPRS Resource). The first indication information may usually be indicated in a field of the DLPRS resource or a DLPRS resource set.

Optionally, a QCL relationship table may be configured for the terminal, and the first QCL relationship between the first positioning reference signal and the target object may be indicated through a transmission configuration indicator state (TCI State) value.

According to the embodiments of the present disclosure, the first indication information indicates the first QCL relationship between the first positioning reference signal and the target object. In this way, the terminal may, according to the first indication information, determine the QCL reference signal of the first positioning reference signal, or determine the QCL reference signal of the target object, so that the QCL information of the PRS is configured.

Optionally, in one embodiment, when the target object at least includes one of the first CSI-RS, the first SSB, the second positioning reference signal and the first TRS, the step of determining the QCL reference signal of the first positioning reference signal according to the first QCL relationship includes:

taking the target object as the QCL reference signal of the first positioning reference signal;

or taking a target signal associated with the target object as the QCL reference signal of the first positioning reference signal.

In this embodiment, the above target objects are different, and the corresponding modes of indicating the target objects are different. Based on different target objects, the determination of the QCL reference signal by the terminal will be described in detail below.

Solution 1: the target object includes the first CSI-RS.

In the solution 1, when the target object includes the first CSI-RS, the first QCL relationship includes a QCL-Type D relationship. The first CSI-RS may be indicated by at least one of a CSI-RS resource ID and a cell ID.

Further, the first CSI-RS is a CSI-RS for mobility management or a CSI-RS for beam management (CSI-RS for BM).

Optionally, in a case that the first CSI-RS belongs to a serving cell, the first CSI-RS is a CSI-RS for beam management; and in a case that the first CSI-RS belongs to a neighboring cell, the first CSI-RS is a CSI-RS for mobility management.

Optionally, when the first positioning reference signal belongs to the serving cell, the first CSI-RS is the CSI-RS for beam management in the serving cell; and when the first positioning reference signal belongs to the neighboring cell, the first CSI-RS is the CSI-RS for mobility. Optionally, the first positioning reference signal and the CSI-RS for mobility belong to the same cell.

When the first CSI-RS is the CSI-RS for beam management, the first CSI-RS is a CSI-RS transmitted by a first target resource in the CSI-RS resource set, and the first target resource is configured with "repetition" by a higher layer. In other words, the first CSI-RS is a resource configured with "repetition" by a higher layer parameter in the CSI-RS resource set.

Optionally, in a case that the first CSI-RS is the CSI-RS for mobility management and the first CSI-RS is associated with a second SSB, the step of taking the target signal associated with the target object as the QCL reference signal of the first positioning reference signal includes:

taking the second SSB as the QCL reference signal of the first positioning reference signal, wherein the QCL relationship between the second SSB and the first positioning reference signal is a QCL-Type A or QCL-Type C relationship. In other words, the terminal may obtain a QCL association relationship between the first positioning reference signal and the second SSB, and assist in measurement or reception of the first positioning reference signal by referring to the timing of the second SSB.

It should be understood that when the QCL relationship is a QCL-Type A, the QCL reference signal may also be understood as a "QCL-Type A" reference signal; and when the QCL relationship is a QCL-Type C, the QCL reference signal may also be understood as a "QCL-Type C" reference signal.

In this embodiment, the CSI-RS is the CSI-RS for mobility and the CSI-RS is configured with the associated second SSB, then the terminal may take the second SSB as the QCL reference signal of the first positioning reference signal, and the QCL relationship is: "QCL-Type C" or "QCL-Type A". In other words, the terminal may obtain a QCL association relationship between the first positioning reference signal and the second SSB, and assist in measurement of the first positioning reference signal by referring to the timing of the second SSB.

It should be understood that the behavior that the terminal takes the second SSB as the QCL reference signal of the first positioning reference signal may be agreed by a protocol, may also be indicated by the network device, or may also be selected by the terminal itself Further, in a case that the QCL relationship between the second SSB and the first CSI-RS meets the QCL-Type D relationship, the step of taking the target signal associated with the target object as the QCL reference signal of the first positioning reference signal further includes:

taking the second SSB as a spatial QCL reference signal of the first positioning reference signal.

In this embodiment, if the second SSB has a spatial QCL relationship with the first CSI-RS, the terminal may take the second SSB as the QCL reference signal of the first positioning reference signal, and the QCL relationship between the second SSB and the first positioning reference signal further includes a QCL-Type D relationship. Specifically, in this embodiment, when the second SSB serves as the QCL reference signal of the first positioning reference signal, the QCL relationship between the second SSB and the first positioning reference signal includes QCL-Type A+QCL-Type D or QCL-Type C+QCL-Type D. In other words, the terminal may obtain a QCL association relationship between the first positioning reference signal and the second SSB, may assist in measurement of the first positioning reference signal by at least referring to the timing of the second SSB, and may take the second SSB as the spatial QCL reference signal of the first positioning reference signal.

Further, in one embodiment, the first indication information is further used to indicate a third SSB, and a second QCL relationship between the third SSB and the first positioning reference signal, wherein the second QCL relationship is a QCL-Type A or QCL-Type C relationship. In other words, the terminal may obtain a QCL association relationship between the first positioning reference signal and the third SSB and may assist in reception of the first positioning reference signal by using at least one of the following modes: assisting in reception of the first positioning reference signal by referring to the timing estimation of the third SSB; and assisting in reception of the first positioning reference signal by performing frequency offset compensation on the channel through the frequency offset estimation of the third SSB.

In this embodiment, the third SSB may be indicated by at least one of SSB index, a cell ID and frequency point information. The frequency point information includes at least one of a band width part (WBP) ID, a component carrier (CC) ID or an absolute radio frequency channel number (ARFCN). Optionally, the second SSB and the first positioning reference signal belong to the same cell. PRS band width may span a plurality of BWPs, so in a case that it is necessary to configure other QCL information except the QCL-Type D for PRS, it is also necessary to configure frequency point information of the QCL reference signal so as to assist the terminal in finding an appropriate QCL reference signal.

Further, in one embodiment, the first indication information is further used to indicate a second TRS, and a QCL-Type A relationship between the first positioning reference signal and the second TRS. In other words, the terminal may obtain a QCL association relationship between the first positioning reference signal and the second TRS and may assist in reception of the first positioning reference signal by using at least one of the following modes: assisting in reception of the first positioning reference signal by referring to the timing estimation of the second TRS; and assisting in reception of the first positioning reference signal by performing frequency offset compensation on the channel through the frequency offset estimation of the second TRS.

In this embodiment, the second TRS may be indicated by at least one of a CSI-RS resource ID, a cell ID and frequency point information. Optionally, the second SSB and the first positioning reference signal belong to the same cell.

It should be understood that the terminal assists in reception of the first positioning reference signal by referring to the timing estimation of the target object, that is, the terminal assists in searching the first positioning reference signal by referring to the timing estimation of the target object as the position of a first positioning reference signal search window. The terminal performs frequency offset compensation on the channel by using the frequency offset estimation of the target object and assists in reception of the first positioning reference signal, that is, the terminal compensates channel frequency offset by using the frequency offset estimation result of the target object, which may reduce the influence of the terminal on the frequency offset in the time domain related processing of the first positioning reference signal.

Solution 2: the target object includes the first SSB.

In the solution 2, when the target object includes the first SSB, the first QCL relationship includes a QCL-Type D relationship.

In this implementation solution, the first SSB may be indicated by at least one of an SSB index, a cell ID and frequency point information.

Optionally, the first QCL relationship further includes a QCL-Type A or QCL-Type C relationship. That is, in this embodiment, the QCL relationship between the first SSB and the first positioning reference signal includes QCL-Type A+QCL-Type D or QCL-Type C+QCL-Type D. In other words, the terminal may obtain the QCL association relationship between the first positioning reference signal and the first SSB, and may assist in reception of the first positioning reference signal by using at least one of the following modes: assisting in reception of the first positioning reference signal by referring to the timing estimation of the third SSB; assisting in reception of the first positioning reference signal by performing offset compensation on the channel through the frequency offset estimation of the third SSB; and using the spatial QCL relationship with the third SSB to determine an appropriate beam to receive the first positioning reference signal.

Optionally, the first indication information is further used to indicate a third TRS, and a QCL-Type A relationship between the third TRS and the first positioning reference signal. The third TRS may be indicated by at least one of a CSI-RS resource ID, a cell ID and frequency point information. In other words, the terminal may obtain the QCL association relationship between the first positioning reference signal and the third TRS, and may assist in reception of the first positioning reference signal by using at least one of the following modes: assisting in reception of the first positioning reference signal by referring to the timing estimation of the third TRS; and performing frequency offset compensation on the channel by using the frequency offset estimation of the third TRS and assisting in reception of the first positioning reference signal. Optionally, the third TRS and the first positioning reference signal belong to the same cell.

Solution 3: the target object includes the second positioning reference signal.

In the solution 3, when the target object includes the second positioning reference signal, the first QCL relationship includes a QCL-Type D relationship. The second positioning reference signal may be indicated by at least one of a PRS resource ID, a PRS resource set and a cell ID.

Optionally, the second positioning reference signal is a positioning reference signal transmitted by a second target resource in the PRS resource set, and the second target resource is configured with "repetition" by a higher layer. In other words, the second positioning reference signal is a resource configured with "repetition" by a higher layer parameter in the PRS resource set.

Optionally, the first QCL relationship further includes a QCL-Type A or QCL-Type C relationship. That is, in this embodiment, the first QCL relationship includes QCL-Type A+QCL-Type D or QCL-Type C+QCL-Type D. In other words, the terminal may obtain a QCL association relationship between the first positioning reference signal and the second positioning reference signal, and may assist in reception of the first positioning reference signal by using at least one of the following modes: assisting in reception of the first positioning reference signal by referring to the timing estimation of the second positioning reference signal; performing frequency offset compensation on the channel by using the frequency offset estimation of the second positioning reference signal; and determining an appropriate beam by using the spatial QCL relationship with the second positioning reference signal to receive the first positioning reference signal.

Optionally, the first indication information is further used to indicate a fourth SSB, and a third QCL relationship between the fourth SSB and the first positioning reference signal, and the third QCL relationship is a QCL-Type A or QCL-Type C relationship. The fourth SSB may be indicated by at least one of an SSB index, a cell ID and frequency point information. In other words, the terminal may obtain a QCL association relationship between the first positioning reference signal and the fourth SSB and may assist in reception of the first positioning reference signal by using at least one of the following modes: assisting in reception of the first positioning reference signal by referring to the timing estimation of the fourth SSB; and assisting in reception of the first positioning reference signal by performing frequency offset compensation on the channel through the frequency offset estimation of the fourth SSB. Optionally, the fourth SSB and the first positioning reference signal belong to the same cell.

Optionally, the first indication information is further used to indicate a fourth TRS, and a QCL-Type A relationship between the fourth TRS and the first positioning reference signal. The fourth TRS may be indicated by at least one of a CSI-RS resource ID, a cell ID and frequency point information. In other words, the terminal may obtain the QCL association relationship between the first positioning reference signal and the fourth TRS, and may assist in reception of the first positioning reference signal by using at least one of the following modes: assisting in reception of the first positioning reference signal by referring to the timing of the fourth TRS; and performing frequency offset compensation by using the frequency offset estimation of the fourth TRS and assisting in reception of the first positioning reference signal. Optionally, the fourth TRS and the first positioning reference signal belong to the same cell.

Solution 4: the target object includes the first TRS.

In the solution 4, when the target object includes the first TRS, the first QCL relationship includes a QCL-Type D and QCL-Type A relationship. The fourth TRS may be indicated by at least one of a CSI-RS resource ID, a cell ID and frequency point information. In other words, the terminal may obtain the QCL association relationship between the first positioning reference signal and the first TRS, and may assist in reception of the first positioning reference signal by using at least one of the following modes: assisting in reception of the first positioning reference signal by referring to the timing estimation of the first TRS; and performing frequency offset compensation on the channel by using the frequency offset estimation of the first TRS, and assisting in reception of the first positioning reference signal. Optionally, the first TRS and the first positioning reference signal belong to the same cell.

In this embodiment, when the first TRS is associated with a fifth SSB, the QCL reference signal of the first positioning reference signal is: the first TRS or the fifth SSB, and the QCL relationship between the fifth SSB and the first positioning reference signal is a QCL-Type D relationship; and when the first TRS is associated with the second CSI-RS, the target QCL reference signal of the first positioning reference signal is: the first TRS or the second CSI-RS, and the QCL relationship between the second CSI-RS and the first positioning reference signal is a QCL-Type D relationship.

That is, in this embodiment, the terminal may indirectly take the SSB associated with the first TRS as a "QCL-Type D" reference signal. Or the terminal may indirectly take the second CSI-RS associated with the first TRS as a "QCL-Type D" reference signal.

It should be noted that in this embodiment, the behavior that the terminal takes the first TRS, the fifth SSB or the second CSI-RS as the target QCL reference signal of the first positioning reference signal specifically may be agreed by a protocol, indicated by the network or selected by the terminal, which is not further limited herein.

Embodiments of the present disclosure provide a possible QCL configuration method for PRS. In addition, the PRS, as a newly introduced reference signal, may also serve as a QCL reference signal of other objects. The following will describe the assistance in measurement of other signals in details.

Optionally, in a case that the target object and the first positioning reference signal has a QCL-Type D relationship, the target object and the first positioning reference signal do not necessarily belong to the same cell. This mode is applicable to the situation where the QCL-Type D relationship of the neighboring cell is difficult to obtain or the situation where the neighboring cell is far away from the terminal.

For example, when the first positioning reference signal belongs to the neighboring cell, the target object may belong to the serving cell. The terminal may determine an appropriate receiving beam according to the QCL-Type D relationship with the target object of the serving cell to receive the first positioning reference signal.

Or when the first positioning reference signal belongs to the neighboring cell, the target object may belong to another neighboring cell. The terminal may determine an appropriate receiving beam according to the QCL-Type D relationship with the target object of another neighboring cell to receive the first positioning reference signal.

Or when the first positioning reference signal belongs to the neighboring cell, the target object may belong to the neighboring cell. The terminal may determine an appropriate receiving beam according to the QCL-Type D relationship with the target object of the neighboring cell to receive the first positioning reference signal.

In this embodiment, the first positioning reference signal is used to serve as a QCL reference signal of the target object.

The target object is a physical signal for mobility management or a target object of a serving cell.

It should be understood that the physical signal for mobility management may include the CSI-RS or SSB of the neighboring cell. The target object of the serving cell may at least include one of CSI-RS, SSB, TRS, SRS, DMRS, PDSCH and PDCCH of the serving cell.

Optionally, the QCL relationship between the first positioning reference signal and the target object is at least one of a QCL-Type A, a QCL-Type C and a QCL-Type D. In other words, the terminal may obtain the QCL association relationship between the target object and the first positioning reference signal, and may assist in reception or transmission of the target object by using at least one of the following modes: assisting in reception or transmission of the target object by referring to the timing estimation of the first positioning reference signal; and assisting the terminal in using an appropriate beam to receive and transmit the target object by referring to beam information of the first positioning reference signal. In this embodiment, for the physical signal for mobility management, such as the CSI-RS for mobility or SSB, the network may configure the first positioning reference signal as a reference signal associated with the physical signal. That is, in a case that the physical signal for mobility management is configured with an associated first positioning reference signal, the terminal may take the timing based on the first positioning reference signal as the timing of a cell where the physical signal is located. The first positioning reference signal may be indicated by at least one of a PRS resource ID, a PRS resource set and a cell ID. The first positioning reference signal and the physical signal for mobility management belong to the same cell. Optionally, the first positioning reference signal is used to serve as a physical signal for mobility management.

For the serving cell, the network may configure the first positioning reference signal of the serving cell as a reference signal associated with a certain physical channel or signal. The terminal may at least obtain an average delay according to the first positioning reference signal for measuring the physical channel or signal. Or the terminal may obtain auxiliary information of the receiving beam (RX beam) according to the first positioning reference signal for receiving the physical channel or signal. The first positioning reference signal may be indicated by at least one of a PRS resource ID and a PRS resource set ID.

Further, the network device may also indicate the PRS to serve as a spatial QCL reference signal (QCL-Type D) of the SRS through a higher layer signaling (such as RRC signaling). The PRS may be indicated by at least one of a PRS resource ID, a PRS resource set ID and a cell ID. According to the beam auxiliary information provided by the PRS, the terminal may determine a transmitting beam of the SRS to transmit the SRS. The PRS may belong to the serving cell or the neighboring cell.

In order to better understand the implementation solution of the present disclosure, the configuration of the QCL is described in details below.

The network device (such as the location server) may configure a QCL relationship table of a certain PRS resource for the terminal through a higher layer signaling (such as an LPP protocol (a direct positioning protocol between the location server and the terminal)):

Case 1: the spatial QCL relationship is not configured for the PRS at the FR1 frequency band, that is, the QCL relationship of "QCL-Type D" is not configured. At this time, the available QCL reference of the PRS is as shown in Table 1.

TABLE 1

| QCL relationship configuration | Downlink reference signal 1 (DL RS1) | QCL Type 1 | Downlink reference signal 2 | QCL Type 2 |
| --- | --- | --- | --- | --- |
| 1 | TRS | QCL-Type A | | |
| 2 | TRS (for the tracked CSI-RS) | QCL-Type B | | |
| 3 | SSB | QCL-Type C | | |

For the configuration 1, the terminal may at least obtain one of an average delay and a Doppler shift from the TRS. According to the average delay, the terminal may obtain the position of a search window of the PRS and rapidly position the position of the PRS. According to the Doppler shift, the terminal may compensate the frequency offset of the channel to improve the receiving performance of the PRS.

For the configuration 2, the terminal may at least obtain a Doppler shift from the TRS. According to the Doppler shift, the terminal may compensate the frequency offset of the channel to improve the receiving performance of the PRS.

For the configuration 3, the terminal may at least obtain one of an average delay and a Doppler shift from the SSB. According to the average delay, the terminal may obtain the position of a search window of the PRS and rapidly position the position of the PRS. According to the Doppler shift, the terminal may compensate the frequency offset of the channel to improve the receiving performance of the PRS.

Further:

optionally, the PRS and the QCL reference signal belong to the same cell. In a case that the PRS configuration has already included cell-ID information, it is unnecessary to specifically indicate the cell ID for the QCL reference signal.

Optionally, the network device indicates ID information of the QCL reference signal at FR1. The ID information of the TRS at least includes at least one of a CSI-RS resource ID, a cell ID and frequency point information. The ID information of the SSB at least includes at least one of an SSB index, a cell ID and frequency point information. The frequency point information includes at least one of an ARFCN, a BWP ID and a CC ID.

Optionally, the premise of configuring the QCL relationship is that the terminal has previously detected the QCL reference signal.

Case 2: the "QCL-Type D" QCL relationship may be configured for the PRS at FR2, which may be as shown in Table 2.

TABLE 2

| QCL relationship configuration | Downlink reference signal 1 | QCL Type 1 | Downlink reference signal 2 | QCL Type 2 |
| --- | --- | --- | --- | --- |
| 1 | SSB | QCL-Type A/QCL-Type C | CSI-RS for BM | QCL-Type D |
| 2 | TRS | QCL-Type A | CSI-RS for BM | QCL-Type D |
| 3 | | | CSI-RS for BM | QCL-Type D |
| 4 | SSB | QCL-Type A/QCL-Type C | CSI-RS for mobility | QCL-Type D |
| 5 | TRS | QCL-Type A | CSI-RS for mobility | QCL-Type D |
| 6 | | | CSI-RS for mobility | QCL-Type D |
| 7 | SSB | QCL-Type A/QCL-Type C | SSB | QCL-Type D |
| 8 | TRS | QCL-Type A | SSB | QCL-Type D |
| 9 | | | SSB | QCL-Type D |
| 10 | TRS | QCL-Type A | TRS | QCL-Type D |
| 11 | PRS | QCL-Type A/QCL-Type C | PRS | QCL-Type D |
| 12 | SSB | QCL-Type A/QCL-Type C | PRS | QCL-Type D |
| 13 | TRS | QCL-Type A | PRS | QCL-Type D |
| 14 | | | PRS | QCL-Type D |

For the configuration 1 and configuration 2, the terminal may at least obtain one of an average delay and a Doppler shift from the TRS or SSB. According to the average delay, the terminal may obtain the position of a search window of the PRS and rapidly position the position of the PRS. According to the Doppler shift, the terminal may compensate the frequency offset of the channel to improve the receiving performance of the PRS. Meanwhile, the terminal obtains RX beam auxiliary information from the CSI-RS for BM for receiving the downlink positioning reference signal resource (DLPRS Resource).

For the configuration 3, the terminal may obtain RX beam auxiliary information only from the CSI-RS for BM for receiving the DLPRS resource.

For the configuration 4, the terminal may at least obtain one of an average delay and a Doppler shift from the SSB. Meanwhile, the terminal obtains RX beam auxiliary information from the CSI-RS for mobility for receiving the DLPRS resource. The SSB may be the SSB associated with the CSI-RS for mobility indicated by the network. The terminal may obtain the timing of the neighboring cell according to the timing of the SSB so as to obtain the position of the PRS search window. Further, in a case that the network device also indicates a spatial QCL relationship between the SSB and the CSI-RS for mobility, the terminal may also obtain an indirect spatial QCL relationship with the SSB according to the Indication for selecting an appropriate RX beam to receive the PRS.

For the configuration 5, the terminal may at least obtain one of an average delay and a Doppler shift from the TRS. Meanwhile, the terminal obtains RX beam auxiliary information from the CSI-RS for mobility for receiving the DLPRS resource.

For the configuration 6, the terminal may obtain RX beam auxiliary information only from the CSI-RS for mobility for receiving the DLPRS resource.

For the configuration 7, the terminal may obtain RX beam auxiliary information from the SSB, and at least obtain one of an average delay and a Doppler shift from the same SSB.

For the configuration 8, the terminal may obtain the RX beam auxiliary information from the SSB, and at least obtain one of an average delay and a Doppler shift from the TRS.

For the configuration 9, the terminal may acquire RX beam auxiliary information only from the SSB.

For the configuration 10, the terminal may at least obtain one of an average delay and a Doppler shift from the TRS, and obtain the RX beam auxiliary information at the same time.

For the configuration 11, the terminal may obtain the RX beam auxiliary information from the PRS, and at least obtain an average delay from the same PRS.

For the configurations 12 and 13, the terminal may obtain the RX beam auxiliary information from the PRS, and at least obtain one of an average delay and a Doppler shift from the SSB or TRS.

For the configuration 14, the terminal may obtain the RX beam auxiliary information only from the PRS for mobility for receiving the DLPRS resource.

Optionally, the PRS and the QCL reference signal belong to the same cell. In a case that the PRS configuration has already included cell-ID information, it is unnecessary to specifically indicate the cell ID for the QCL reference signal.

Optionally, the network device indicates ID information of the QCL reference signal at FR2. The ID information of the TRS at least includes at least one of a CSI-RS resource ID, a cell ID and frequency point information. The ID information of the SSB at least includes at least one of an SSB index, a cell ID and frequency point information. The frequency point information includes at least one of an ARFCN, a BWP ID and a CC ID. The ID information of the CSI-RS for BM or the CSI-RS for mobility at least includes at least one of a CSI-RS resource ID and a cell ID.

Optionally, the premise of configuring the QCL relationship is that the terminal has previously detected the QCL reference signal.

Further, the network device may configure a physical signal for mobility management, such as CSI-RS for mobility or SSB, of a neighboring cell A for the terminal through an RRC signaling; meanwhile, the network device configures RPS for the signal to serve as a reference signal associated with the signal, and the PRS belongs to the neighboring cell A. The PRS may be indicated by at least one of a PRS resource ID, a PRS resource set ID and a cell ID. According to the PRS configured by the network, the terminal may obtain the timing of the neighboring cell A, and measure the physical signal for mobility management according to the timing measurement.

Optionally, the association relationship between the PRS and the physical signal may be expressed by the QCL relationship, such as "QCL-Type C". The terminal may at least use the average delay in the "QCL-Type C" to measure the physical signal.

Optionally, the network device may also indicate that the PRS and the physical signal have a spatial QCL relationship, namely "QCL-Type D".

For the serving cell, the network device may configure the PRS of the serving cell as a reference signal associated with a certain physical channel or signal through the RRC signaling. The physical channel or signal may at least include: one of PDSCH, PDCCH, DMRS and CSI-RS.

The terminal may at least obtain an average delay or delay spread according to the PRS for measuring the physical channel or signal. For example, the average delay and the delay spread may be used to demodulate DMRS.

Or the terminal may obtain auxiliary information of the RX beam according to the PRS for receiving the physical channel or signal. The PRS may be indicated by at least one of the PRS resource ID and the PRS resource set ID.

Optionally, the network device may configure the QCL relationship between the PRS and the physical channel or signal as at least one of "QCL-Type A", "QCL-Type C" and "QCL-Type D".

Further, the network device may also indicate the PRS as the signal for mobility management of the neighboring cell. The terminal may perform radio resource management (RRM) measurement based on the PRS to perform mobility management.

Further, the network device may also indicate the PRS to serve as a spatial QCL reference signal (QCL-Type D) of the SRS through a higher layer signaling (such as RRC signaling). The PRS may be indicated by at least one of a PRS resource ID, a PRS resource set ID and a cell ID. According to the beam auxiliary information provided by the PRS, the terminal may determine a transmitting beam of the SRS to transmit the SRS. The PRS may belong to the serving cell or the neighboring cell.

Figure 3:
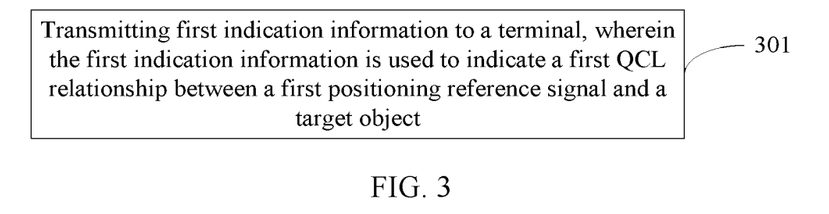
FIG. 3 is a flowchart of a method for configuring QCL information according to an embodiment of the present disclosure.

Referring to FIG. 3, FIG. 3 is a flowchart of another method for configuring QCL information according to an embodiment of the present disclosure. The method is applied to a network device. As shown in FIG. 3, the method includes the following step:

step 301: transmitting first indication information to a terminal, wherein the first indication information is used to indicate a first QCL relationship between a first positioning reference signal and a target object; and the target object at least includes one of a first channel state information-reference signal (CSI-RS), a first synchronization signal and PBCH block (SSB), a second positioning reference signal, a first tracking reference signal (TRS), a first sounding reference signal (SRS), a first demodulation reference signal (DMRS), a first physical downlink shared channel (PDSCH) and a first physical downlink control channel (PDCCH).

Optionally, when the target object at least includes one of the first CSI-RS, the first SSB, the second positioning reference signal and the first TRS, the target object serves as a QCL reference signal of the first positioning reference signal; or a target signal associated with the target object serves as a QCL reference signal of the first positioning reference signal.

Optionally, when the target object includes the first CSI-RS, the first QCL relationship includes a QCL-Type D relationship.

Optionally, the first CSI-RS is a CSI-RS for mobility management or a CSI-RS for beam management.

Optionally, when the first positioning reference signal belongs to a serving cell, the first CSI-RS is the CSI-RS for beam management; and when the first positioning reference signal belongs to a neighboring cell, the first CSI-RS is the CSI-RS for mobility management.

Optionally, in a case that the first CSI-RS is the CSI-RS for mobility management and the first CSI-RS is associated with the second SSB, the second SSB serves as the QCL reference signal of the first positioning reference signal, and the QCL relationship between the second SSB and the first positioning reference signal is a QCL-Type A or QCL-Type C relationship.

Optionally, in a case that the QCL relationship between the second SSB and the first CSI-RS meets the QCL-Type D relationship, the second SSB serves as a spatial QCL reference signal of the first positioning reference signal.

Optionally, the first indication information is further used to indicate a third SSB, and a second QCL relationship between the third SSB and the first positioning reference signal, and the second QCL relationship is a QCL-Type A or QCL-Type C relationship.

Optionally, the first indication information is further used to indicate a second TRS, and a QCL-Type A relationship between the second TRS and the first positioning reference signal.

Optionally, when the target object includes the first SSB, the first QCL relationship includes a QCL-Type D relationship.

Optionally, the first QCL relationship further includes a QCL-Type A or QCL-Type C relationship.

Optionally, the first indication information is further used to indicate a third TRS, and a QCL-Type A relationship between the third TRS and the first positioning reference signal.

Optionally, when the target object includes the second positioning reference signal, the first QCL relationship includes a QCL-Type D relationship.

Optionally, the first QCL relationship further includes a QCL-Type A or QCL-Type C relationship.

Optionally, the first indication information is further used to indicate a fourth SSB, and a third QCL relationship between the fourth SSB and the first positioning reference signal, and the third QCL relationship is a QCL-Type A or QCL-Type C relationship.

Optionally, the first indication information is further used to indicate a fourth TRS, and a QCL-Type A relationship between the fourth TRS and the first positioning reference signal.

Optionally, when the target object includes the first TRS, the first QCL relationship includes QCL-Type D and QCL-Type A relationships.

Optionally, the first positioning reference signal is used to serve as a QCL reference signal of the target object.

Optionally, the target object is a physical signal for mobility management or a target object of a serving cell.

Optionally, the QCL relationship between the first positioning reference signal and the target object is at least one of a QCL-Type A, a QCL-Type C and a QCL-Type D.

Optionally, the target object and the first positioning reference signal belong to the same cell.

It should be noted that the embodiment is an implementation manner of the terminal corresponding to the embodiment shown in FIG. 2. For the specific implementation mode, refer to the relevant description of the embodiment shown in FIG. 2. The same technical effects can be achieved. To avoid repetition, details are not described herein again.

Figure 4:
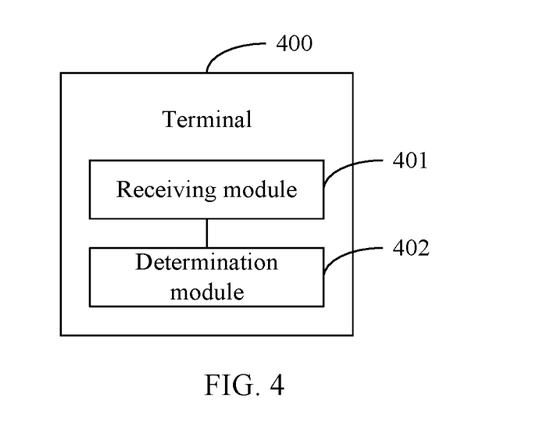
FIG. 4 is a structural diagram of a terminal according to an embodiment of the present disclosure.

Referring to FIG. 4, FIG. 4 is a structural diagram of a terminal according to an embodiment of the present disclosure. As shown in FIG. 4, the terminal 400 includes:

a receiving module 401, configured to receive first indication information transmitted by the network device, wherein the first indication information is used to indicate a first QCL relationship between a first positioning reference signal and a target object; and a determination module 402, configured to, according to the first QCL relationship, determine a QCL reference signal of the first positioning reference signal, or determine a QCL reference signal of the target object, wherein the target object at least includes one of a first channel state information-reference signal (CSI-RS), a synchronization signal and PBCH block (SSB), a second positioning reference signal, a first tracking reference signal (TRS), a first sounding reference signal (SRS), a first demodulation reference signal (DMRS), a first physical downlink shared channel (PDSCH) and a first physical downlink control channel (PDCCH).

Optionally, when the target object at least includes one of the first CSI-RS, the first SSB, the second positioning reference signal and the first TRS, the determination module 402 is specifically configured to:

take the target object as the QCL reference signal of the first positioning reference signal;

or take a target signal associated with the target object as the QCL reference signal of the first positioning reference signal.

Optionally, when the target object includes the first CSI-RS, the first QCL relationship includes a QCL-Type D relationship.

Optionally, the first CSI-RS is a CSI-RS for mobility management or a CSI-RS for beam management.

Optionally, when the first positioning reference signal belongs to a serving cell, the first CSI-RS is the CSI-RS for beam management; and when the first positioning reference signal belongs to a neighboring cell, the first CSI-RS is the CSI-RS for mobility management.

Optionally, in a case that the first CSI-RS is the CSI-RS for mobility management and the first CSI-RS is associated with the second SSB, the determination module is specifically configured to: take the second SSB as the QCL reference signal of the first positioning reference signal, and the QCL relationship between the second SSB and the first positioning reference signal is a QCL-Type A or QCL-Type C relationship.

Optionally, in a case that the QCL relationship between the second SSB and the first CSI-RS meets the QCL-Type D relationship, the determination module is specifically configured to:

taking the second SSB as a spatial QCL reference signal of the first positioning reference signal.

Optionally, the first indication information is further used to indicate a third SSB, and a second QCL relationship between the third SSB and the first positioning reference signal, and the second QCL relationship is a QCL-Type A or QCL-Type C relationship.

Optionally, the first indication information is further used to indicate a second TRS, and a QCL-Type A relationship between the second TRS and the first positioning reference signal.

Optionally, when the target object includes the first SSB, the first QCL relationship includes a QCL-Type D relationship.

Optionally, the first QCL relationship further includes a QCL-Type A or QCL-Type C relationship.

Optionally, the first indication information is further used to indicate a third TRS, and a QCL-Type A relationship between the third TRS and the first positioning reference signal.

Optionally, when the target object includes the second positioning reference signal, the first QCL relationship includes a QCL-Type D relationship.

Optionally, the first QCL relationship further includes a QCL-Type A or QCL-Type C relationship.

Optionally, the first indication information is further used to indicate a fourth SSB, and a third QCL relationship between the fourth SSB and the first positioning reference signal, and the third QCL relationship is a QCL-Type A or QCL-Type C relationship.

Optionally, the first indication information is further used to indicate a fourth TRS, and a QCL-Type A relationship between the fourth TRS and the first positioning reference signal.

Optionally, when the target object includes the first TRS, the first QCL relationship includes QCL-Type D and QCL-Type A relationships.

Optionally, the first positioning reference signal is used to serve as a QCL reference signal of the target object.

Optionally, the target object is a physical signal for mobility management or a target object of a serving cell.

Optionally, the QCL relationship between the first positioning reference signal and the target object is at least one of a QCL-Type A, a QCL-Type C and a QCL-Type D.

Optionally, the target object and the first positioning reference signal belong to the same cell.

The terminal provided by this embodiment of the present disclosure can implement the processes implemented by the terminal in the method embodiment in FIG. 2. To avoid repetition, details are not described herein again.

Figure 5:
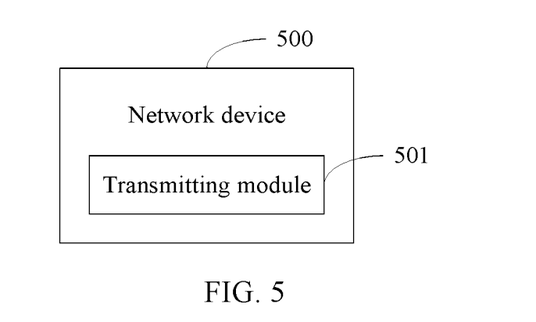
FIG. 5 is a structural diagram of a network device according to an embodiment of the present disclosure.

Referring to FIG. 5, FIG. 5 is a structural diagram of a network device according to an embodiment of the present disclosure. As shown in FIG. 5, the network device 500 includes:

a transmitting module 501, configured to transmit first indication information to a terminal, wherein the first indication information is used to indicate a first QCL relationship between a first positioning reference signal and a target object; and the target object at least includes one of a first channel state information-reference signal (CSI-RS), a synchronization signal and PBCH block (SSB), a second positioning reference signal, a first tracking reference signal (TRS), a first sounding reference signal (SRS), a first demodulation reference signal (DMRS), a first physical downlink shared channel (PDSCH) and a first physical downlink control channel (PDCCH).

Optionally, when the target object at least includes one of the first CSI-RS, the first SSB, the second positioning reference signal and the first TRS, the target object serves as a QCL reference signal of the first positioning reference signal; or a target signal associated with the target object serves as a QCL reference signal of the first positioning reference signal.

Optionally, when the target object includes the first CSI-RS, the first QCL relationship includes a QCL-Type D relationship.

Optionally, the first CSI-RS is a CSI-RS for mobility management or a CSI-RS for beam management.

Optionally, when the first positioning reference signal belongs to a serving cell, the first CSI-RS is the CSI-RS for beam management; and when the first positioning reference signal belongs to a neighboring cell, the first CSI-RS is the CSI-RS for mobility management.

Optionally, in a case that the first CSI-RS is the CSI-RS for mobility management and the first CSI-RS is associated with the second SSB, the second SSB serves as the QCL reference signal of the first positioning reference signal, and the QCL relationship between the second SSB and the first positioning reference signal is a QCL-Type A or QCL-Type C relationship.

Optionally, in a case that the QCL relationship between the second SSB and the first CSI-RS meets the QCL-Type D relationship, the second SSB serves as a spatial QCL reference signal of the first positioning reference signal.

Optionally, the first indication information is further used to indicate a third SSB, and a second QCL relationship between the third SSB and the first positioning reference signal, and the second QCL relationship is a QCL-Type A or QCL-Type C relationship.

Optionally, the first indication information is further used to indicate a second TRS, and a QCL-Type A relationship between the second TRS and the first positioning reference signal.

Optionally, when the target object includes the first SSB, the first QCL relationship includes a QCL-Type D relationship.

Optionally, the first QCL relationship further includes a QCL-Type A or QCL-Type C relationship.

Optionally, the first indication information is further used to indicate a third TRS, and a QCL-Type A relationship between the third TRS and the first positioning reference signal.

Optionally, when the target object includes the second positioning reference signal, the first QCL relationship includes a QCL-Type D relationship.

Optionally, the first QCL relationship further includes a QCL-Type A or QCL-Type C relationship.

Optionally, the first indication information is further used to indicate a fourth SSB, and a third QCL relationship between the fourth SSB and the first positioning reference signal, and the third QCL relationship is a QCL-Type A or QCL-Type C relationship.

Optionally, the first indication information is further used to indicate a fourth TRS, and a QCL-Type A relationship between the fourth TRS and the first positioning reference signal.

Optionally, when the target object includes the first TRS, the first QCL relationship includes QCL-Type D and QCL-Type A relationships.

Optionally, the first positioning reference signal is used to serve as a QCL reference signal of the target object.

Optionally, the target object is a physical signal for mobility management or a target object of a serving cell.

Optionally, the QCL relationship between the first positioning reference signal and the target object is at least one of a QCL-Type A, a QCL-Type C and a QCL-Type D.

Optionally, the target object and the first positioning reference signal belong to the same cell.

A network device according to an embodiment of the present disclosure can implement the processes of the network device in the embodiment in FIG. 3. To avoid repetition, details are not described herein again. The resource overhead of the configuration can be reduced.

Figure 6:
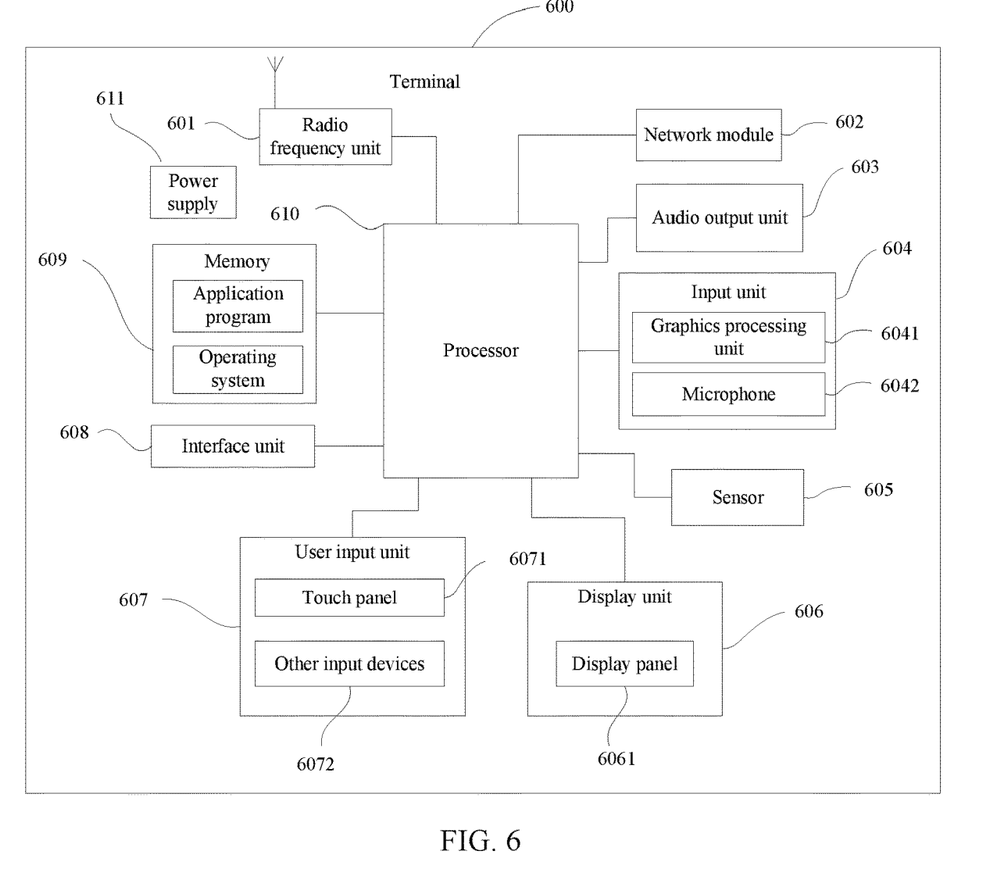
FIG. 6 is a structural diagram of another terminal according to an embodiment of the present disclosure.

FIG. 6 is a schematic diagram of a hardware structure of a terminal for implementing embodiments of the present disclosure.

The terminal 600 includes but is not limited to: a radio frequency unit 601, a network module 602, an audio output unit 603, an input unit 604, a sensor 605, a display unit 606, a user input unit 607, an interface unit 608, a memory 609, a processor 610, a power supply 611 and the like. A person skilled in the art may understand that the structure of the terminal shown in FIG. 6 does not constitute a limitation to the terminal. The terminal may include more or fewer components than that shown in the figure, or a combination of some components, or an arrangement of different components. In this embodiment of the present disclosure, the terminal includes but is not limited to a mobile phone, a tablet computer, a notebook computer, a palmtop computer, a vehicle-mounted terminal, a wearable device, a pedometer, or the like.

A radio frequency unit 601 is configured to receive first indication information transmitted by the network device, wherein the first indication information is used to indicate a first QCL relationship between a first positioning reference signal and a target object; and a processor 610, configured to determine the QCL reference signal of the first positioning reference signal or the target object according to the first QCL relationship, wherein the target object at least includes one of a first channel state information-reference signal (CSI-RS), a synchronization signal and PBCH block (SSB), a second positioning reference signal, a first tracking reference signal (TRS), a first sounding reference signal (SRS), a first demodulation reference signal (DMRS), a first physical downlink shared channel (PDSCH) and a first physical downlink control channel (PDCCH).

According to the embodiments of the present disclosure, the first indication information indicates the first QCL relationship between the first positioning reference signal and the target object. In this way, the terminal may, according to the first indication information, determine the QCL reference signal of the first positioning reference signal, or determine the QCL reference signal of the target object, so that the QCL information of the PRS is configured.

It should be understood that, in this embodiment of the present disclosure, the radio frequency unit 601 may be configured to receive and transmit information or a signal in a call process. Specifically, after receiving downlink data from a base station, the radio frequency unit 601 transmits the downlink data to the processor 610 for processing. In addition, the radio frequency unit 601 transmits uplink data to the base station. Usually, the radio frequency unit 601 includes but is not limited to an antenna, at least one amplifier, a transceiver, a coupler, a low noise amplifier, a duplexer, and the like In addition, the radio frequency unit 601 may also communicate with other devices through a wireless communication system and a network.

The terminal provides wireless broadband Internet access for the user by using the network module 602, for example, helping the user to send and receive an e-mail, browse a web page, and access streaming media.

The audio output unit 603 may convert audio data received by the radio frequency unit 601 or the network module 602 or stored in the memory 609 into an audio signal, and output the audio signal into sound. In addition, the audio output unit 603 can also provide audio output related to a specific function performed by the terminal 600 (for example, call signal receiving sound or message receiving sound). The audio output unit 603 includes a loudspeaker, a buzzer, a receiver, and the like.

The input unit 604 is configured to receive audio or radio frequency signals. The input unit 604 may include a graphics processing unit (Graphics Processing Unit, GPU) 6041 and a microphone 6042, and the graphics processing unit 6041 processes image data of a still picture or video obtained by an image capture device (such as a camera) in a video capture mode or an image capture mode. A processed image frame can be displayed on the display unit 606. The image frame processed by the graphics processing unit 6041 may be stored in the memory 609 (or another storage medium) or transmitted via the radio frequency unit 601 or the network module 602. The microphone 6042 may receive a sound and can process such sound into audio data. The processed audio data may be converted, in a telephone call mode, into a format that may be sent by the radio frequency unit 601 to a mobile communication base station for output.

The terminal 600 further includes at least one sensor 605, for example, a light sensor, a motion sensor and other sensors. Specifically, the light sensor includes an ambient light sensor and a proximity sensor. The ambient light sensor may adjust luminance of the display panel 6061 based on brightness of ambient light. The proximity sensor may turn off the display panel 6061 and/or backlight when the terminal 600 moves to an ear. As a type of the motion sensor, an accelerometer sensor may detect an acceleration value in each direction (generally, three axes), and detect a value and a direction of gravity when the accelerometer sensor is static, and may be configured to recognize a mobile terminal posture (such as screen switching between landscape and portrait modes, a related game, or magnetometer posture calibration), a function related to vibration recognition (such as a pedometer or a knock), and the like. The sensor 605 may further include a fingerprint sensor, a pressure sensor, an iris sensor, a molecular sensor, a gyroscope, a barometer, a hygrometer, a thermometer, an infrared sensor, and the like. Details are not described herein.

The display unit 606 may be configured to display information entered by a user or information provided for the user. The display unit 606 may include the display panel 6061, and the display panel 6061 may be configured in a form of a liquid crystal display (Liquid Crystal Display, LCD), an organic light-emitting diode (Organic Light-Emitting Diode, OLED), or the like.

The user input unit 607 may be configured to receive input digital or character information, and generate key signal input related to user setting and function control of a terminal. In particular, the user input unit 607 includes a touch panel 6071 and other input devices 6072. The touch panel 6071, also called a touch screen, may collect touch operation on or near the touch panel by users (for example, operation on the touch panel 6071 or near the touch panel 6071 by fingers or any suitable objects or accessories such as a touch pen by the users). The touch panel 6071 may include two parts: a touch detection device and a touch controller. The touch detection device detects a touch position of a user, detects a signal brought by a touch operation, and transmits the signal to the touch controller. The touch controller receives touch information from the touch detection apparatus, converts the touch information into contact coordinates, sends the contact coordinates to the processor 610, and receives and executes a command from the processor 610. In addition, the touch panel 6071 may be of a resistive type, a capacitive type, an infrared type, a surface acoustic wave type, or the like. In addition to the touch panel 6071, the user input unit 607 may further include the other input devices 6072. Specifically, the other input devices 6072 may include but are not limited to: a physical keyboard, a function key (such as a volume control key, a switch key), a trackball, a mouse, and a joystick, which is no longer repeated here.

Further, the touch panel 6071 may cover the display panel 6061. When detecting a touch operation on or near the touch panel 6071, the touch panel 6071 transmits the touch operation to the processor 610 to determine a type of a touch event. Then the processor 610 provides corresponding visual output on the display panel 6061 based on the type of the touch event. Although in FIG. 6, the touch panel 6071 and the display panel 6061 are used as two independent components to implement input and output functions of the terminal, in some embodiments, the touch panel 6071 and the display panel 6061 may be integrated to implement the input and output functions of the mobile terminal. This is not specifically limited herein.

The interface unit 608 is an interface connecting an external apparatus to the terminal 600. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 608 may be configured to receive an input (for example, data information and power) from the external apparatus and transmit the received input to one or more elements in the terminal 600, or transmit data between the terminal 600 and the external apparatus.

The memory 609 may be configured to store software programs and various data. The memory 609 may mainly include a program storage area and a data storage area, wherein the program storage area may store an operating system, an application program required by at least one function (such as a sound playback function and an image playback function), and the like; and the data storage area may store data (such as audio data and a phone book) created based on the use of the mobile phone, and the like. In addition, the memory 609 may include a high-speed random access memory or a nonvolatile memory, for example, at least one disk storage device, a flash memory, or other volatile solid-state storage devices.

The processor 610 is a control center of the terminal, connects various parts of the entire terminal by using various interfaces and circuits, and performs various functions of the terminal and processes data by running or executing software programs and/or modules stored in the memory 609 and invoking data stored in the memory 609, so as to monitor the terminal as a whole. The processor 610 may include one or more processing units. Optionally, the processor 610 may be integrated with an application processor and a modem processor. The application processor mainly processes an operating system, a user interface, an application program, and the like, and the modem processor mainly processes wireless communication. It may be understood that the foregoing modem processor may not be integrated into the processor 610.

The terminal 600 may further include the power supply 611 (for example, a battery) configured to supply power to various components. Optionally, the power supply 611 may be logically connected to the processor 610 through a power management system, so as to implement functions such as managing charging, discharging, and power consumption through the power management system.

In addition, the terminal 600 includes some function modules that are not shown, which are not elaborated here.

Optionally, embodiments of the present disclosure further provide a terminal, including a processor 610, a memory 609, and a computer program stored in the memory 609 and capable of running on the processor 610. When the computer program is executed by the processor 610, each process of the embodiments of the method for configuring the QCL information can be implemented, and a same technical effect can be achieved. To avoid repetition, details are not described herein again.

Figure 7:
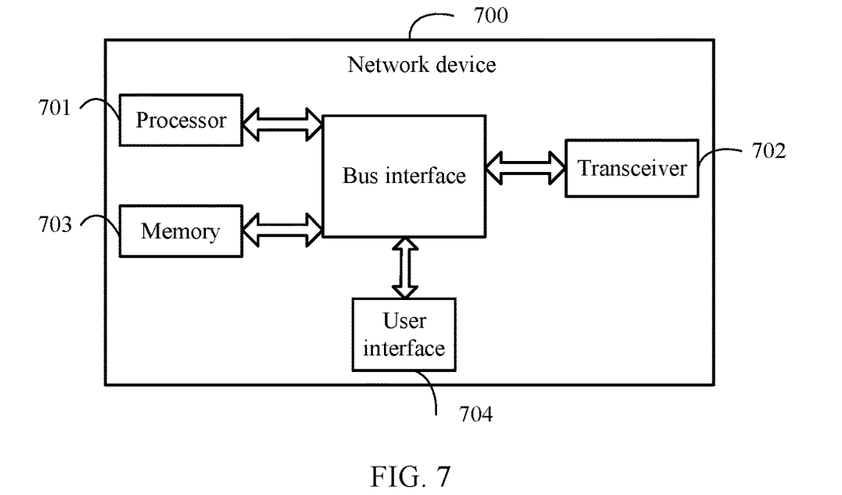
FIG. 7 is a structural diagram of another network device according to an embodiment of the present disclosure.

Referring to FIG. 7, FIG. 7 is a structural diagram of another network device according embodiments of the present disclosure. As shown in FIG. 7, a network device 700 includes: a processor 701, a transceiver 702, a memory 703 and a bus interface, wherein:

the transceiver 702 is configured to transmit first indication information to a terminal, wherein the first indication information is used to indicate a first QCL relationship between a first positioning reference signal and a target object; and the target object at least includes one of a first channel state information-reference signal (CSI-RS), a synchronization signal and PBCH block (SSB), a second positioning reference signal, a first tracking reference signal (TRS), a first sounding reference signal (SRS), a first demodulation reference signal (DMRS), a first physical downlink shared channel (PDSCH) and a first physical downlink control channel (PDCCH).

According to the embodiments of the present disclosure, the first indication information indicates the first QCL relationship between the first positioning reference signal and the target object. In this way, the terminal may, according to the first indication information, determine the QCL reference signal of the first positioning reference signal, or determine the QCL reference signal of the target object, so that the QCL information of the PRS is configured.

In FIG. 7, the bus architecture may include any number of interconnected buses and bridges, which are specifically linked together by various circuits of one or more processors represented by the processor 701 and a memory represented by the memory 703. The bus architecture may further link various other circuits such as a peripheral device, a voltage regulator, and a power management circuit together. These are all well-known in the art, and therefore are not further described in this specification. The bus interface provides an interface. The transceiver 702 may be a plurality of elements, that is, including a transmitter and a receiver, and provides a unit configured to communicate with various other devices on a transmission medium. For different user equipment, the user interface 704 may further be an interface capable of externally and internally connecting required equipment. The connected equipment includes but is not limited to a keypad, a display, a speaker, a microphone, a joystick, and the like.

The processor 701 is responsible for bus architecture management and general processing. The memory 703 may store data used by the processor 701 when the processor 701 performs an operation.

Optionally, embodiments of the present disclosure further provide a network device, including a processor 701, a memory 703, and a computer program stored in the memory 703 and executable on the processor 701. When the computer program is executed by the processor 701, each process of the embodiments of the method for configuring the QCL information can be implemented, and a same technical effect can be achieved. To avoid repetition, details are not described herein again.

Embodiments of the present disclosure further provide a computer readable storage medium, wherein the computer readable storage medium stores a computer program; when the computer program is executed by the processor, the processes of the embodiments of the method for configuring the QCL information for a network device side provided in the embodiment of the present disclosure are implemented, or when the computer program is executed by the processor, the processes of the method for determining the QCL information for a terminal side provided in the embodiment of the present disclosure are implemented, and the same technical effects can be achieved. To avoid repetition, details are not described herein again. The computer readable storage medium is, for example, a read-only memory (ROM for short), a random access memory (RAM for short), a magnetic disk, or an optical disc.

It should be noted that, in this specification, the terms "include", "comprise", or their any other variant is intended to cover a non-exclusive inclusion, so that a process, a method, an article, or a device that includes a list of elements not only includes those elements but also includes other elements which are not expressly listed, or further includes elements inherent to such process, method, article, or device. In the absence of more restrictions, an element defined by the statement "including a . . . " does not exclude another same element in a process, method, article, or device that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially, or the part contributing to the related technologies may be implemented in a form of a software product. The computer software product is stored in a storage medium (for example, a ROM/RAM, a magnetic disk, or an optical disc), and includes a plurality of instructions for instructing a terminal (which may be a mobile phone, a computer, a server, an air conditioner, a base station, or the like) to perform the method described in the embodiments of the present disclosure.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skills in the art may make many forms without departing from the aims of the present disclosure and the protection scope of claims, all of which fall within the protection of the present disclosure.

The invention claimed is:

1. A method for determining quasi co-located (QCL) information, applied to a terminal and comprising:
   receiving first indication information transmitted by the network device, wherein the first indication information is used to indicate a first QCL relationship between a first positioning reference signal and a target object; and
   according to the first QCL relationship, determining a QCL reference signal of the first positioning reference signal, or determining a QCL reference signal of the target object,
   wherein the target object at least includes one of a first channel state information-reference signal (CSI-RS), a synchronization signal and PBCH block (SSB), a second positioning reference signal, a first tracking reference signal (TRS), a first sounding reference signal (SRS), a first demodulation reference signal (DMRS), a first physical downlink shared channel (PDSCH) and a first physical downlink control channel (PDCCH).

2. The method according to claim 1, wherein when the target object at least comprises one of the first CSI-RS, the first SSB, the second positioning reference signal and the first TRS, the step of determining the QCL reference signal of the first positioning reference signal according to the first QCL relationship comprises:
   taking the target object as the QCL reference signal of the first positioning reference signal;
   or taking a target signal associated with the target object as the QCL reference signal of the first positioning reference signal.

3. The method according to claim 2, wherein when the target object comprises the first CSI-RS, the first QCL relationship comprises a QCL-Type D relationship.

4. The method according to claim 3, wherein the first CSI-RS is a CSI-RS for mobility management or a CSI-RS for beam management.

5. The method according to claim 4, wherein when the first positioning reference signal belongs to a serving cell, the first CSI-RS is the CSI-RS for beam management; and
   when the first positioning reference signal belongs to a neighboring cell, the first CSI-RS is the CSI-RS for mobility management.

6. The method according to claim 3, wherein in a case that the first CSI-RS is the CSI-RS for mobility management and the first CSI-RS is associated with a second SSB, the step of taking the target signal associated with the target object as the QCL reference signal of the first positioning reference signal comprises:
   taking the second SSB as the QCL reference signal of the first positioning reference signal, wherein the QCL relationship between the second SSB and the first positioning reference signal is a QCL-Type A or QCLA type C relationship.

7. The method according to claim 6, wherein in a case that the QCL relationship between the second SSB and the first CSI-RS meets the QCL-Type D relationship, the step of taking the target signal associated with the target object as the QCL reference signal of the first positioning reference signal further comprises:
   taking the second SSB as a spatial QCL reference signal of the first positioning reference signal.

8. The method according to claim 3, wherein the first indication information is further used to indicate a third SSB, and a second QCL relationship between the third SSB and the first positioning reference signal, wherein the second QCL relationship is a QCL-Type A or QCL-Type C relationship.

9. The method according to claim 2, wherein when the target object comprises the first SSB, the first QCL relationship comprises a QCL-Type D relationship.

10. The method according to claim 2, wherein when the target object comprises the second positioning reference signal, the first QCL relationship comprises a QCL-Type D relationship.

11. The method according to claim 2, wherein the resource of the second positioning reference signal is indicated by at least one of a PRS resource ID, a positioning reference signal resource set ID and a cell identifier.

12. The method according to claim 10, wherein the first indication information is further used to indicate a fourth SSB, and a third QCL relationship between the fourth SSB and the first positioning reference signal; and the third QCL relationship is a QCL-Type A or QCL-Type C relationship.

13. The method according to claim 1, wherein the first positioning reference signal is used to serve as a QCL reference signal of the target object.

14. A method for configuring quasi co-located (QCL) information, applied to a network device and comprising:
   transmitting first indication information to a terminal, wherein the first indication information is used to indicate a first QCL relationship between a first positioning reference signal and a target object; and
   wherein the target object at least includes one of a first channel state information-reference signal (CSI-RS), a synchronization signal and PBCH block (SSB), a second positioning reference signal, a first tracking reference signal (TRS), a first sounding reference signal (SRS), a first demodulation reference signal (DMRS), a first physical downlink shared channel (PDSCH) and a first physical downlink control channel (PDCCH).

15. The method according to claim 14, wherein when the target object at least comprises one of the first CSI-RS, the first SSB, the second positioning reference signal and the first TRS, the target object serves as a QCL reference signal of the first positioning reference signal; or a target signal associated with the target object serves as a QCL reference signal of the first positioning reference signal.

16. The method according to claim 15, wherein when the target object comprises the first CSI-RS, the first QCL relationship comprises a QCL-Type D relationship.

17. The method according to claim 16, wherein the first CSI-RS is a CSI-RS for mobility management or a CSI-RS for beam management;
wherein when the first positioning reference signal belongs to a serving cell, the first CSI-RS is the CSI-RS for beam management; and
when the first positioning reference signal belongs to a neighboring cell, the first CSI-RS is the CSI-RS for mobility management.

18. The method according to claim 16, wherein in a case that the first CSI-RS is the CSI-RS for mobility management and the first CSI-RS is associated with a second SSB, the second SSB serves as a QCL reference signal of the first positioning reference signal, and a QCL relationship between the second SSB and the first positioning reference signal is a QCL-Type A or QCL-Type C relationship.

19. The method according to claim 16, wherein the first indication information is further used to indicate a third SSB, and a second QCL relationship between the third SSB and the first positioning reference signal, wherein the second QCL relationship is a QCL-Type A or QCL-Type C relationship.

20. A terminal, comprising a memory, a processor, and a program stored in the memory and executable on the processor, wherein the program is executed by the processor to implement:
receiving first indication information transmitted by the network device, wherein the first indication information is used to indicate a first QCL relationship between a first positioning reference signal and a target object; and
according to the first QCL relationship, determining a QCL reference signal of the first positioning reference signal, or determining a QCL reference signal of the target object,
wherein the target object at least includes one of a first channel state information-reference signal (CSI-RS), a synchronization signal and PBCH block (SSB), a second positioning reference signal, a first tracking reference signal (TRS), a first sounding reference signal (SRS), a first demodulation reference signal (DMRS), a first physical downlink shared channel (PDSCH) and a first physical downlink control channel (PDCCH).

\* \* \* \* \*